United States Patent
Murakawa

(10) Patent No.: US 7,028,337 B2
(45) Date of Patent: Apr. 11, 2006

(54) METHOD OF VIRTUAL PRIVATE NETWORK COMMUNICATION IN SECURITY GATEWAY APPARATUS AND SECURITY GATEWAY APPARATUS USING THE SAME

(75) Inventor: Yasushi Murakawa, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 866 days.

(21) Appl. No.: 09/729,262

(22) Filed: Dec. 1, 2000

(65) Prior Publication Data

US 2001/0020273 A1    Sep. 6, 2001

(30) Foreign Application Priority Data

Dec. 3, 1999    (JP)    ................................ 11-344500

(51) Int. Cl.
*H04L 9/00*    (2006.01)

(52) U.S. Cl. ....................................................... 726/15
(58) Field of Classification Search ................ 709/238; 713/153, 201; 707/227; 726/15
See application file for complete search history.

(56) References Cited

U.S. PATENT DOCUMENTS

| 6,615,357 B1 * | 9/2003 | Boden et al. ................ 713/201 |
| 6,751,729 B1 * | 6/2004 | Giniger et al. .............. 713/153 |
| 6,779,004 B1 * | 8/2004 | Zintel ......................... 709/227 |

* cited by examiner

*Primary Examiner*—Gregory Morse
*Assistant Examiner*—Ellen C Tran
(74) *Attorney, Agent, or Firm*—RatnerPrestia

(57) ABSTRACT

A method of the Virtual Private Network (VPN) communication employed for a security gateway apparatus and the security gateway apparatus using the same, which allow a personal computer outside a local area network (LAN) to access, via a WAN, to a terminal on the LAN, virtually regarding the outside PC as a terminal on the LAN. The communication method is employed for a security gateway apparatus to connect, through concentration and conversion process, between a LAN and a WAN including a public network. Security Architecture for the Internet Protocol (IPsec) establishes VPN with an outside PC having a dialup connection to the WAN. During an Internet Key Exchange (IKE) communication that is performed prior to the IPsec communication, the security gateway apparatus integrates a Dynamic Host Configuration Protocol (DHCP) communication option into an IKE data, and designates the IP address of the outside PC from a tunneled IP packet.

24 Claims, 8 Drawing Sheets

METHOD OF VIRTUAL PRIVATE NETWORK COMMUNICATION IN SECURITY GATEWAY APPARATUS AND SECURITY GATEWAY APPARATUS USING THE SAME

FIELD OF THE INVENTION

The present invention relates to a method of virtual private network (VPN) communication in a security gateway apparatus and security gateway apparatus using the same. More particularly, this method and apparatus are used in a network environment configured by security gateway apparatus connecting a local area network (LAN) including a plurality of terminal devices, and a wide area network (WAN) typified by a public network. In such a network environment, the VPN communication method allows a terminal device outside a LAN to communicate with the security gateway apparatus via a WAN.

BACKGROUND OF THE INVENTION

In recent years, the widespread proliferation of the Internet access has brought many PCs into various businesses or even individual households, and such PCs often communicate with each other on a local area network (LAN) for more effective use. When a LAN configured by some PCs is connected to the Internet, a gateway apparatus that connects a LAN and a WAN is required.

To access a terminal on a LAN from a PC outside the LAN, the PC firstly needs to establish a dialup connection with the provider that the PC signs on, then to access the terminal, for example, a PC on the LAN via a WAN.

However, packets transmitted through a WAN are not basically safeguarded. Intercepted such packets by eavesdroppers, there would be a fear of making bad use of sensitive information.

A security gateway apparatus connecting the WAN and the LAN need to be used to protect such information from unauthorized access and provide data security. It is also required that the PC, which has a dialup connection with the WAN, is equipped with a communication protocol stack for data security. In this way, it makes possible to realize a virtual private line environment on a WAN, by establishing the VPN communication between the PC located outside the LAN and the security gateway apparatus.

Currently, typically used communication protocol for the VPN communication is Security Architecture for the Internet Protocol (IPsec).

Now will be described the overview of the VPN communication employing IPsec, referring to FIG. 5. FIG. 5 is a block diagram of a typical network system including a WAN.

The network system comprises, as shown in FIG. 5, PC 101, which is located outside the LAN, establishing a dialup connection to the provider, WAN 102, and security gateway 103 that connects WAN 102 and LAN 104 for line connection and conversion processing.

LAN 104 being subjected to security gateway 103 includes server terminal 105 and client PCs 106, 107.

Besides, in order to perform the IPsec communication, VPN 108 is established between PC 101 and security gateway 103.

When PC 101 establishes a dialup connection to the provider and accesses to a terminal on LAN 104, VPN 108 will be established between PC 101 and security gateway 103, with a virtual private line environment achieved on WAN 102. This environment protects information exchanged on WAN 102 from interception or alteration, ensuring safety communication between PC 101 and the terminal on LAN 104.

Now will be described the outline of required information for performing the IPsec communication, referring to FIG. 6. FIG. 6 illustrates a state of WAN connection.

PC 101, WAN 102, and security gateway 103 are the same as those described in FIG. 5.

In order to perform IPsec communication between PC 101 and security gateway 103, the followings have to be shared with the both sides prior to IP sec communication.

1) data security;
2) countermeasures against making alterations to transmitting data by avoiding to use a fixed logical communication path;
3) encrypting algorithm that protects data to be transmitted from alteration;
4) key information used for authentication algorithm.

There are two methods of sharing key information on both sides of communication partners: (1) setting the key information manually on both sides prior to communication, and (2) setting the key information automatically with the Internet Key Exchange (IKE) protocol on initiating communication.

Hereinafter will be focused on the latter method, which is practically used in actual communication.

The IPsec communication will be described with reference to FIG. 7. FIG. 7 is a flow diagram that illustrates the working of security gateway 103 for starting the IPsec communication.

To perform the IPsec communication, it is necessary to establish Security Association (SA) that is a two-way logical connection between the both sides. For that reason, the IKE communication has two phases.

Phase 1 is to establish IKE-SA for performing the IKE communication with safety (S11, S12). With the connection established successfully, phase 2 will be in active for exchanging security information including key information for the IPsec communication (S13).

When IPsec—SA is successfully established (S14) in phase 2, the IKE communication is over then IPsec communication initiates.(S15).

The table below shows the information to be exchanged between the both sides, in phase 2 of IKE communication (indicated by S13 in the description above.)

TABLE 1

| Item | Detail |
| --- | --- |
| Security Protocol | Encapsulating Security Payload (ESP)/Authentication Header (AH) |
| IPsec communication mode | Tunnel mode/Transport mode |
| Encryption algorithm | Must in ESP |
| Encryption key | — |
| Authentication algorithm | Must in AH, May be selected in ESP |
| Authentication key | — |
| SA life time format | Data amount (Byte)/hour |
| SA life time | — |

As for the operating mode (IPsec communication mode), security gateway 103 is in active in the tunnel mode (encapsulating whole IP packets) only. In the explanation below, the IPsec operating mode is assumed to be the tunnel mode.

FIG. 8 schematically illustrates of the IPsec communication in the tunnel mode. In FIG. 8, PC 101, security gateway 103, LAN 104, client PC 106, and VPN 108 are the same as those illustrated in FIG. 5. IP packet 100 is handled in this system.

In FIG. 8, suppose that IP addresses "A", "B", and "C" are assigned to PC 101, security gateway 103, and client PC 106, respectively. IP address "A" assigned to PC 101 is provided from the provider.

When client PC 106 on LAN 104 transmits an IP packet to PC 101, which has established connection with PC 106 via VPN 108, 1) client PC 106 generates IP packet 100 in which the sender's IP address is "C" and the receiver's IP address is "A", then sends it to security gateway 103;
2) received packet 100, gateway 103 identifies that the packet is the one to be sent to PC 101 which has established VPN 108;
3) gateway 103 encapsulates IP packet 100 according to exchanged information during the IKE communication;
4) the IP header including the sender's IP address B and the receiver's IP address "A" is added to outside the originally set IP address;
5) authentication information is added to the encapsulated IP packet based on the exchanged information, then the IP packet is encrypted;
6) received the encapsulated packet via VPN 108, PC 101 retrieves encapsulated original IP packet 100 from the received packet, according to the exchanged information, then process it.

The VPN communication method in the prior-art security gateway apparatus assures safety of data exchanging on WAN 102. However, an access from outside of the LAN is treated as the access from an outside network.

The fact has brought an inconvenience or some security problems described below when a terminal outside the LAN tries to establish a dialup connection to the WAN and accesses to client PC 106 on LAN 104.

1) the security policy setting indicating acceptable/unacceptable access is required to PC 106. For example, PC 106 needs an information setting by which PC 106 can determine which IP address is acceptable or which protocol service is unacceptable.
2) the setting described above has to be set each time an outside terminal accesses to a terminal on the LAN. Unless the setting procedures are performed completely, the security level could be degraded.
3) When the outside terminal accesses to a server on the LAN, even after the terminal has successfully established the IPsec communication with the gateway apparatus, the server needs another setting procedures for identifying the outside terminal and giving a permission to communicate with a terminal on the LAN. Like the security policy setting described above, the security level could be degraded unless the setting procedures are performed completely.

Besides, if LAN 104 is a network configured with private IP addresses, the setting procedures would be extremely complicated.

SUMMARY OF THE INVENTION

The present invention addresses the problems above. It is therefore the object of the present invention to provide a VPN communication method in a security gateway apparatus, allowing a PC outside a LAN, virtually regarded as a PC on the LAN, to communicate with a terminal on the LAN.

The present invention provides a VPN communication method in a security gateway apparatus that connects, via line connection and conversion processing, between a LAN and a WAN that is typically configured by a public network.

According to the present invention, during the procedure in which the IPsec protocol establishes the VPN communication between a security gateway apparatus and an outside PC having a dialup connection with a WAN, the security gateway apparatus integrates the Dynamic Host Configuration Protocol (DHCP) communication option into the IKE data during the IKE communication prior to the IPsec communication. Through the procedure, the security gateway apparatus can designate the IP address of the outside terminal in a tunneled IP packet.

In this way, the present invention allows an outside terminal to communicate with a terminal on the LAN, by virtually regarding the outside terminal as another terminal on the LAN.

DESCRIPTION OF THE PREFERRED EMBODIMENTS

The preferred embodiments of the present invention are described hereinafter with reference to the accompanying drawings, FIG. 1 through FIG. 3.

First Preferred Embodiment

Figure 3:
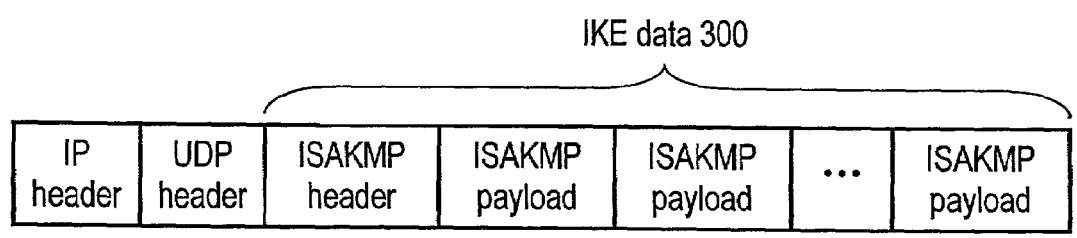
FIG. 3 shows a data format for the IKE communication used for the VPN communication method in the security gateway apparatus in accordance with the first preferred embodiment.

FIG. 3 shows a data format for the IKE communication used for the VPN communication method in the security gateway apparatus in accordance with the first preferred embodiment.

The IKE communication is performed with User Datagram Protocol (UDP)/Internet Protocol (IP). As shown in FIG. 3, the IKE data is formed of the Internet Security Association and Key Management Protocol (ISAKMP) header and a series of the ISAKMP payloads that follows the ISAKMP header. The IKE communication is performed between an initiator requesting key exchange, and a responder responding to the request.

Figure 1:
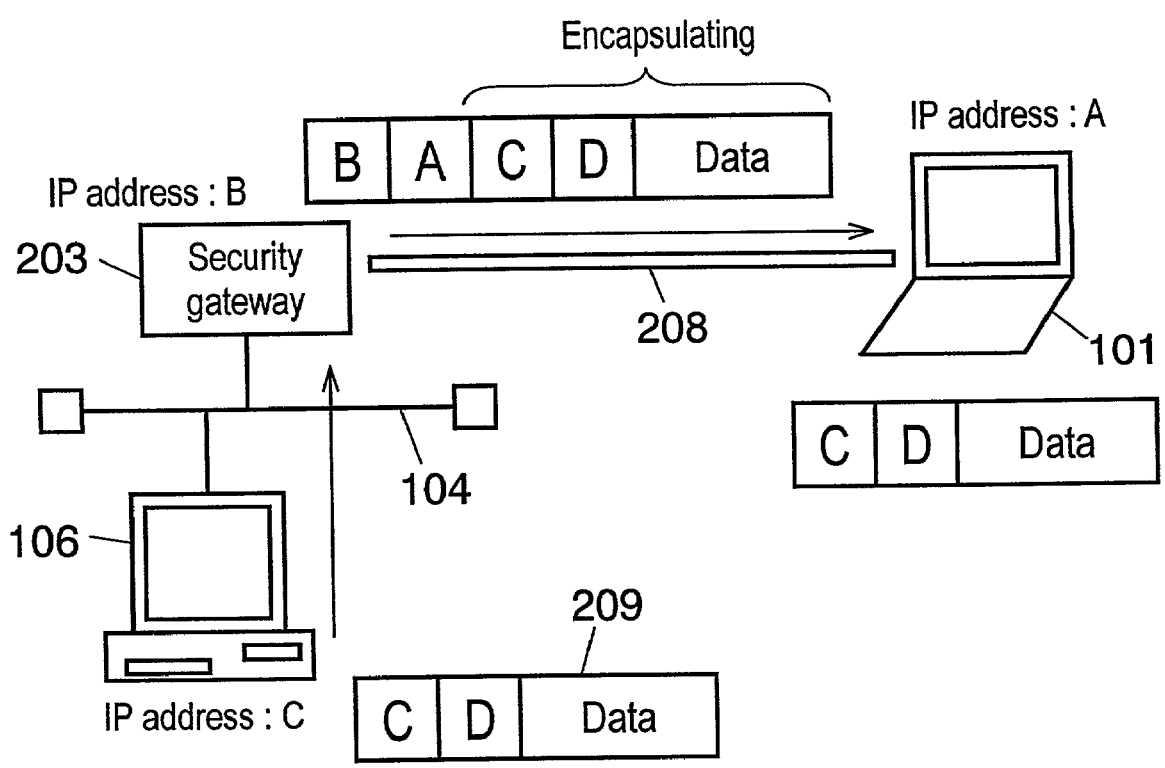
FIG. 1 illustrates diagrammatically an IPsec communication in accordance with a first preferred embodiment of the present invention.

According to the embodiment, FIG. 1 shows PC 101 as an example of a terminal connecting the Internet via a provider.

Served as an initiator, PC 101 initiates the IKE communication with security gateway 203 in order to access client PC 106 on LAN 104. On the other hand, security gateway 203 serves as a responder in the communication.

The communication is performed in the form of server/client model. As for the Encryption key and the Authentication key in the items listed in Table 1, key information is exchanged between the initiator and the responder, using a public key cryptosystem. As for the rest of the items, the initiator gives suggestions to the responder, and the responder responds to the initiator with the best among the suggestions.

There are some pieces of information essential to PC 101 as a Dynamic Host Configuration Protocol (DHCP) client: (i) an IP address; (ii) a subnet mask; (iii) an expiration date of the IP address; and (iv) a domain name.

Security gateway 203, which serves as the responder in the IKE communication, adds these four items to a normally formed IKE data as an option.

Of the four items, the expiration date of the IP address may be omitted from the option added to the IKE data, by regarding that the expiration date is equivalent to the SA life time that is established by the IKE communication.

DHCP is an application protocol positioned in the higher layer than UDP belongs to, so that it runs on the IKE without problems associated with resending control or other functions.

FIG. 1 illustrates diagrammatically the IPsec communication in accordance with the first preferred embodiment of the present invention.

Figure 5:
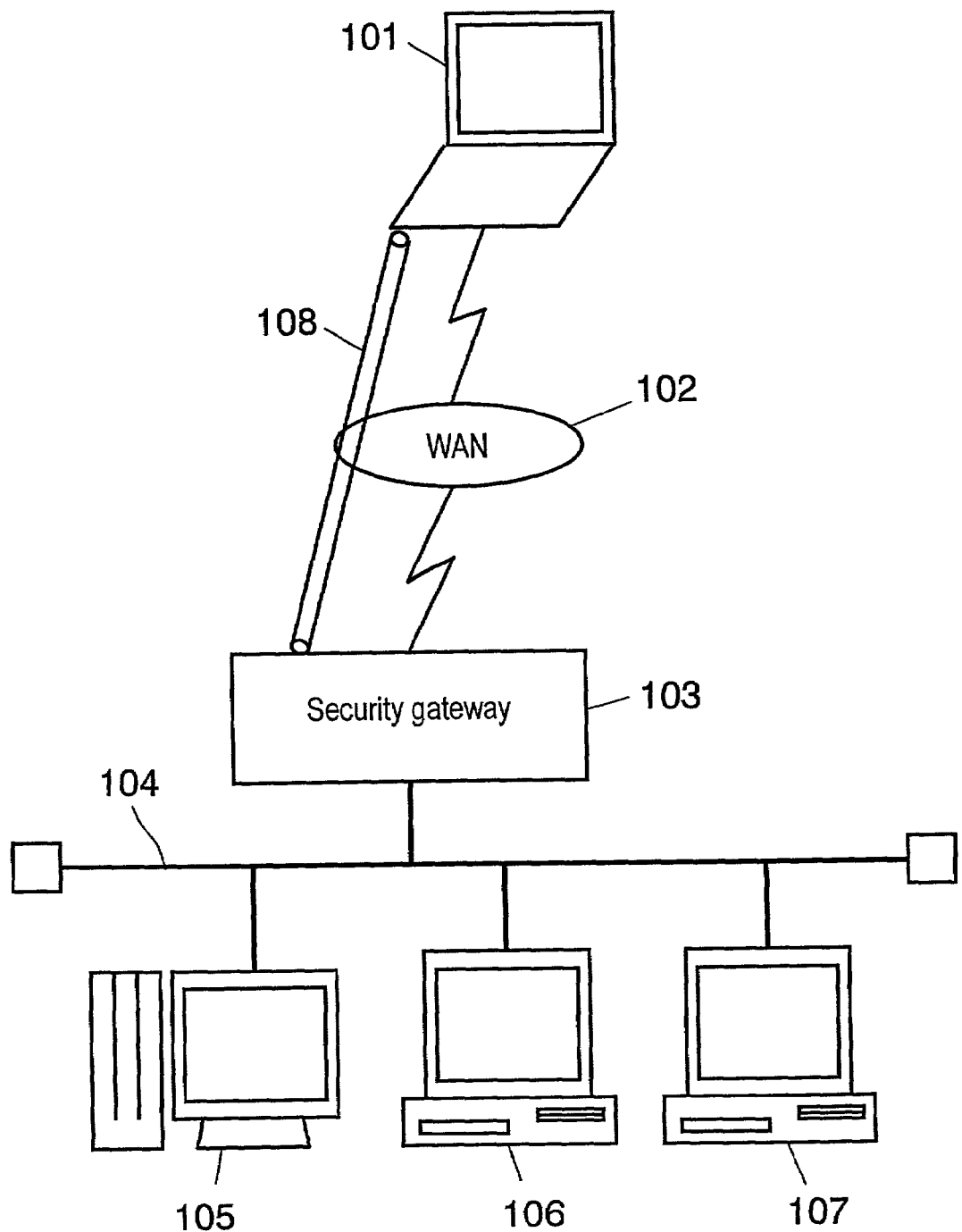
FIG. 5 shows a prior art typical network system including a WAN.
Figure 6:
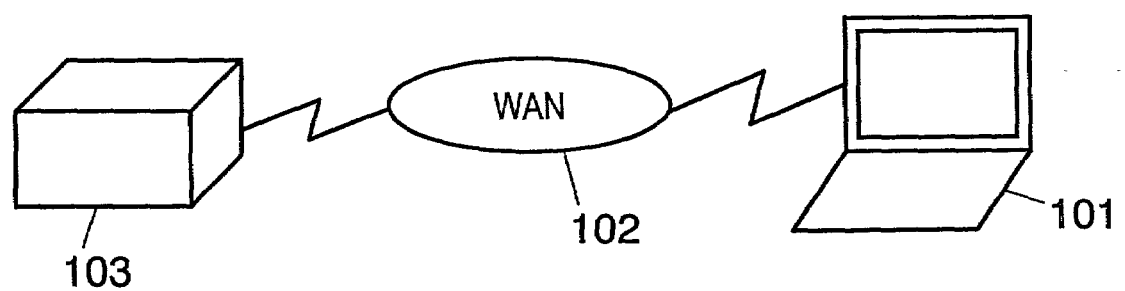
FIG. 6 shows a prior art configuration in which an outside PC and the security gateway apparatus are connected via a WAN.
Figure 7:
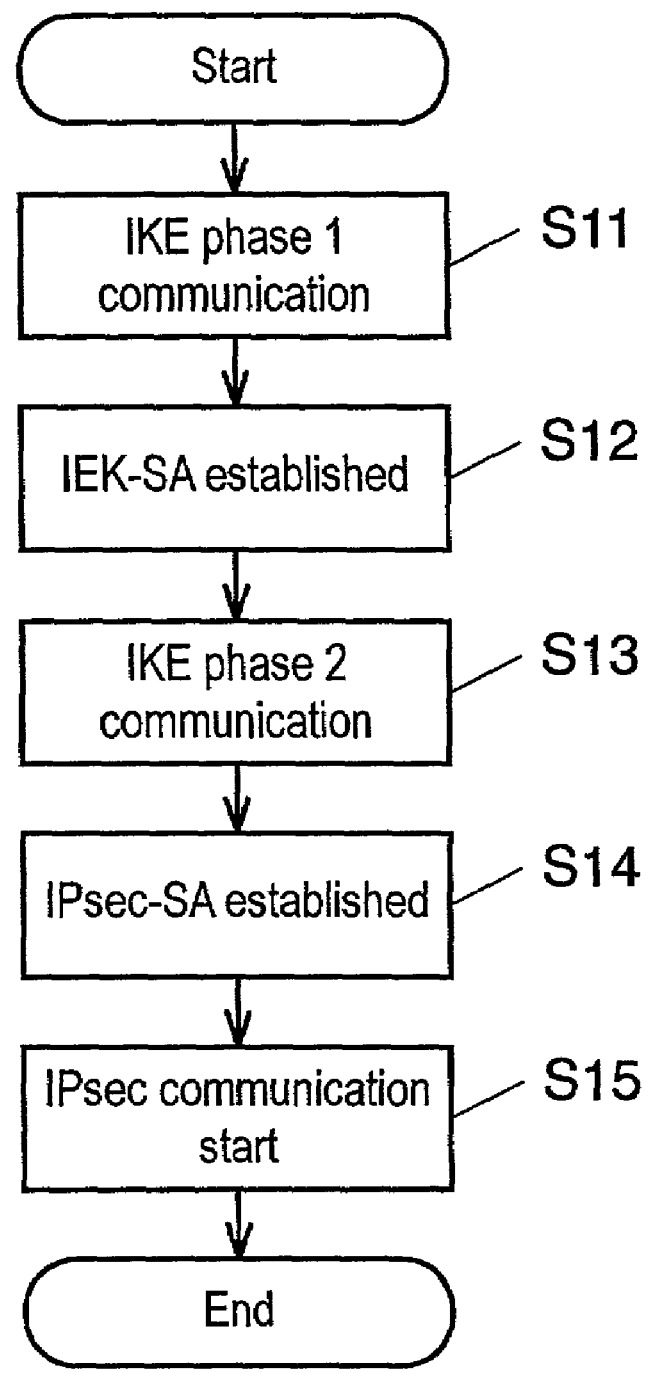
FIG. 7 is a flow chart indicative of the working steps of the prior art security gateway apparatus to initiate the IPsec communication.
Figure 8:
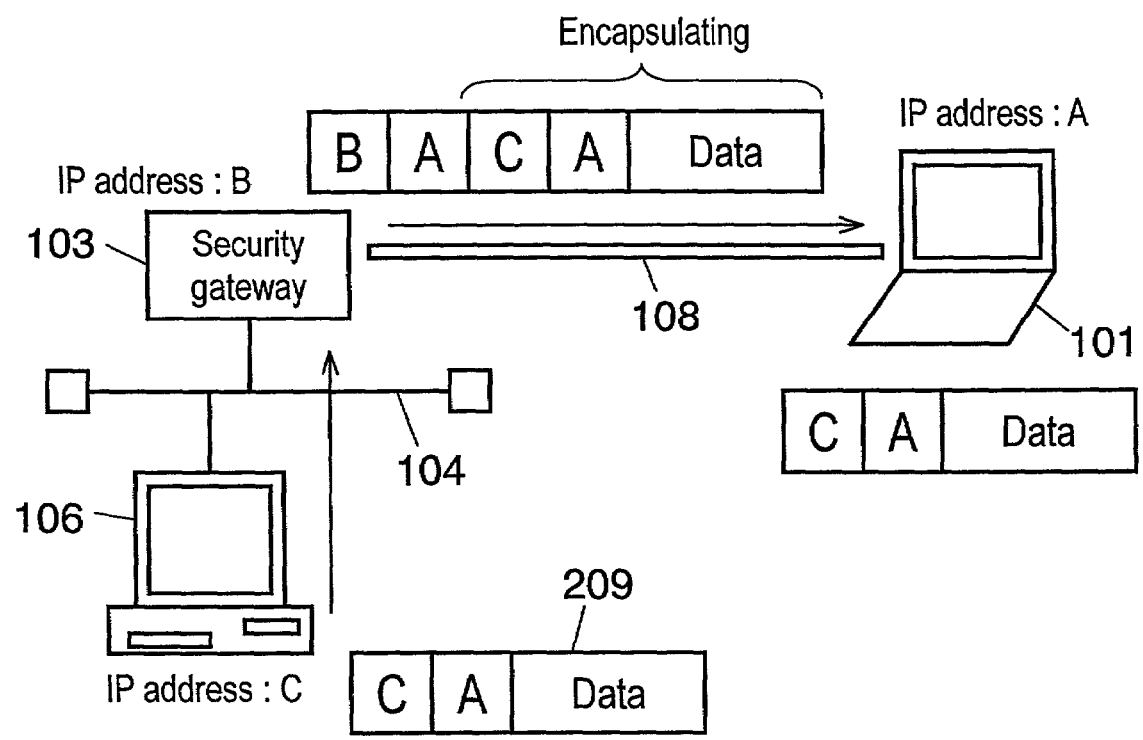
FIG. 8 illustrates diagrammatically of the prior art IPsec communication in the tunnel mode.

The interconnection of PC 101, security gateway 203, LAN 104, client PC 106, and VPN 208 in FIG. 1 is the same as that of PC 101, security gateway 103, LAN 104, client PC 106, and VPN 108 in FIG. 5.

In FIG. 1, suppose that IP addresses "A", "B", and "C" are assigned to PC 101, security gateway 203, and client PC 106, respectively. IP address "A" assigned to PC 101 is provided from the provider.

Security gateway 203 distributes IP address "D" to PC 101 during the IKE communication prior to the IPsec communication.

When client PC 106 on LAN 104 transmits an IP packet to PC 101 having connection via VPN 208, the transmission is performed following the steps below:

1) client PC 106 generates IP packet 209, in which the sender's IP address is "C" and the receiver's IP address is "D", regardless of IP address "A" which is assigned to PC 101 by the provider outside the LAN 104, and transmits packet 209 to security gateway 203;
2) received the packet, security gateway 203 identifies that the packet is the one to be sent to PC 101 which has established VPN 208, then encapsulates IP packet 209 according to exchanged information through IKE communication;
3) the IP header including the sender's IP address "B" and the receiver's IP address "A" is added to outside the originally set IP address;
4) authentication information is added to the encapsulated IP packet based on the exchanged information, then the IP packet is encrypted;
5) received the encapsulated packet via VPN 208, PC 101 retrieves, from the received packet, encapsulated original IP packet 209 based on the exchanged information, then process it according to the obtained subnet mask and domain name during the IKE communication.

Figure 2:
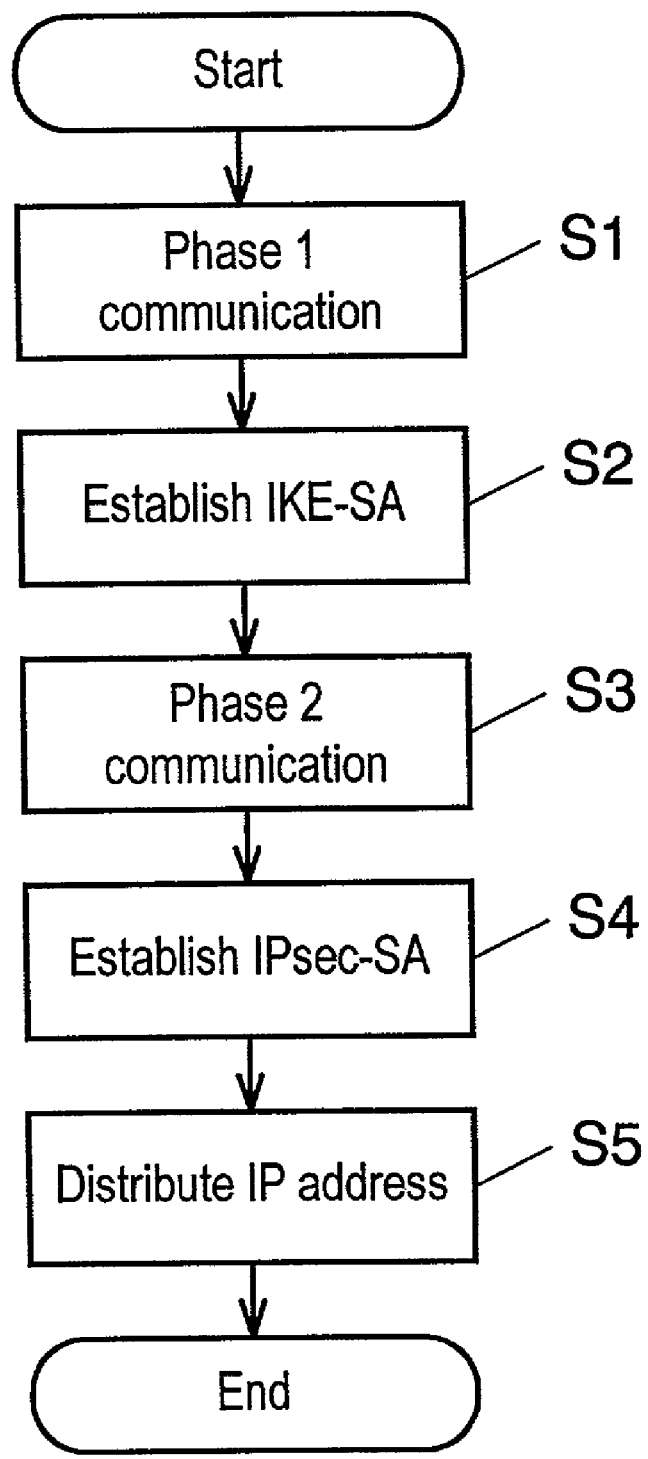
FIG. 2 is a flow chart indicative of the procedure in which a security gateway apparatus distributes an IP address to an outside PC.

FIG. 2 is a flow chart illustrating the procedure in which security gateway 203 establishes the IKE communication and IPsec—Security Association (SA) connections to initiate the IPsec communication, and distributes IP address "D" to PC 101.

To perform the IPsec communication, it is necessary to establish SA that is a two-way logical connection between the both sides. For that reason, the IKE communication has two phases.

Phase 1 is to establish IKE-SA for performing the IKE communication with safety (S1, S2). With the connection established successfully, phase 2 will be in active for exchanging security information including key information for the IPsec communication (S3).

In phase 2, IPsec—SA is established and the DHCP option is added to the IKE data (S4).

Following the completion of distributing IP address "D" to PC 101 (S5), the IKE communication is over.

Table 1 shows required information for the IPsec communication, which is exchanged between the both sides during the IKE (phase 2) communication in step S3.

According to the embodiment, as described above, in the procedure that the gateway apparatus establishes VPN 208 connection, using the IPsec protocol, with PC 101 having a dialup connection to WAN 102, the gateway apparatus integrates the DHCP communication option into the IKE data during the IKE communication prior to the IPsec communication. Through the procedure, the security gateway apparatus can designate, from a tunneled IP packet, the sender's IP address "C" to be processed in the IPsec communication.

When establishing the IPsec communication with outside PC 101 having a dialup connection with the WAN, security gateway 203 thus controls IP address "A" of the outside PC as the final destination. As an advantage, the need for setting of client PC 106 on LAN 104 can be eliminated in this procedure.

This fact promises a highly safeguarded communication without interception or alteration of transmitting information.

Second Preferred Embodiment

Here will be described the VPN communication method employed for the security gateway apparatus in accordance with the second preferred embodiment, referring to FIG. 1.

During the distribution process of DHCP information to PC 101, security gateway 203 distributes to PC 101 an IP address and a subnet mask having the same segment as those of LAN 104 controlled by security gateway 203. In this procedure, security gateway 203 serves as the responder, while PC 101 serves as the initiator in the IKE communication.

In the IPsec communication after VPN 208 establishment, PC 101, which accesses from the outside of LAN 104, can behave as if being a standalone terminal that has the "same" segment as a terminal on the network has, in communicating with client PC 106 controlled by security gateway 203.

According to the embodiment, as described above, security gateway 203 distributes to PC 101, which accesses from outside the LAN 104 by establishing a dialup connection, an IP address and a subnet mask which have the same segment as those used on LAN 104 controlled by security gateway 203 in the IKE communication. This allows outside PC 101 to virtually work on LAN 104 in the VPN communication.

The fact that outside PC 101 which has established VPN 208 works as if being in the LAN 104 environment realizes the access from an outside terminal to a terminal on LAN 104 with security.

Third Preferred Embodiment

Now will be described the VPN communication method employed for the security gateway apparatus in accordance with the third preferred embodiment, referring to FIG. 1.

In FIG. 1, the explanation is focused on the case, in which security gateway 203 employs the Network Address Translator (NAT) technology and configures LAN 104 with private IP addresses.

In this case, an access from an outside terminal to client PC 106 on LAN 104 is usually not allowed. However, the following method makes it possible.

First, PC 101 having a dialup connection establishes the IKE communication with security gateway 203 for VPN 208 establishment. During the IKE communication, security gateway 203 integrates a private IP address into the IKE data as a DHCP option. The private IP address is an unused one in the segment that is allocated to LAN 104 controlled by security gateway 203.

Then gateway 203 distributes the IKE data to PC 101.

Through this procedure, PC 101 uses a global IP address in VPN 208 on WAN 102, while it manipulates a private IP address on LAN 104 and inside PC 101 itself. This allows PC 101 to behave as if being a standalone terminal that has the "same" segment as a terminal on the network does.

According to the embodiment, as described above, gateway 203 distributes to outside PC 101, through the NAT technology, a private IP address used for the terminals on LAN 104 during the IKE communication. The distribution procedure realizes the VPN communication in which a terminal outside the LAN is allowed to be accessible into the LAN 104 environment, which is configured with private IP addresses. Thus, outside PC 101 can access to the LAN 104 environment configured with private IP addresses, ensuring security.

Fourth Preferred Embodiment

Figure 4:
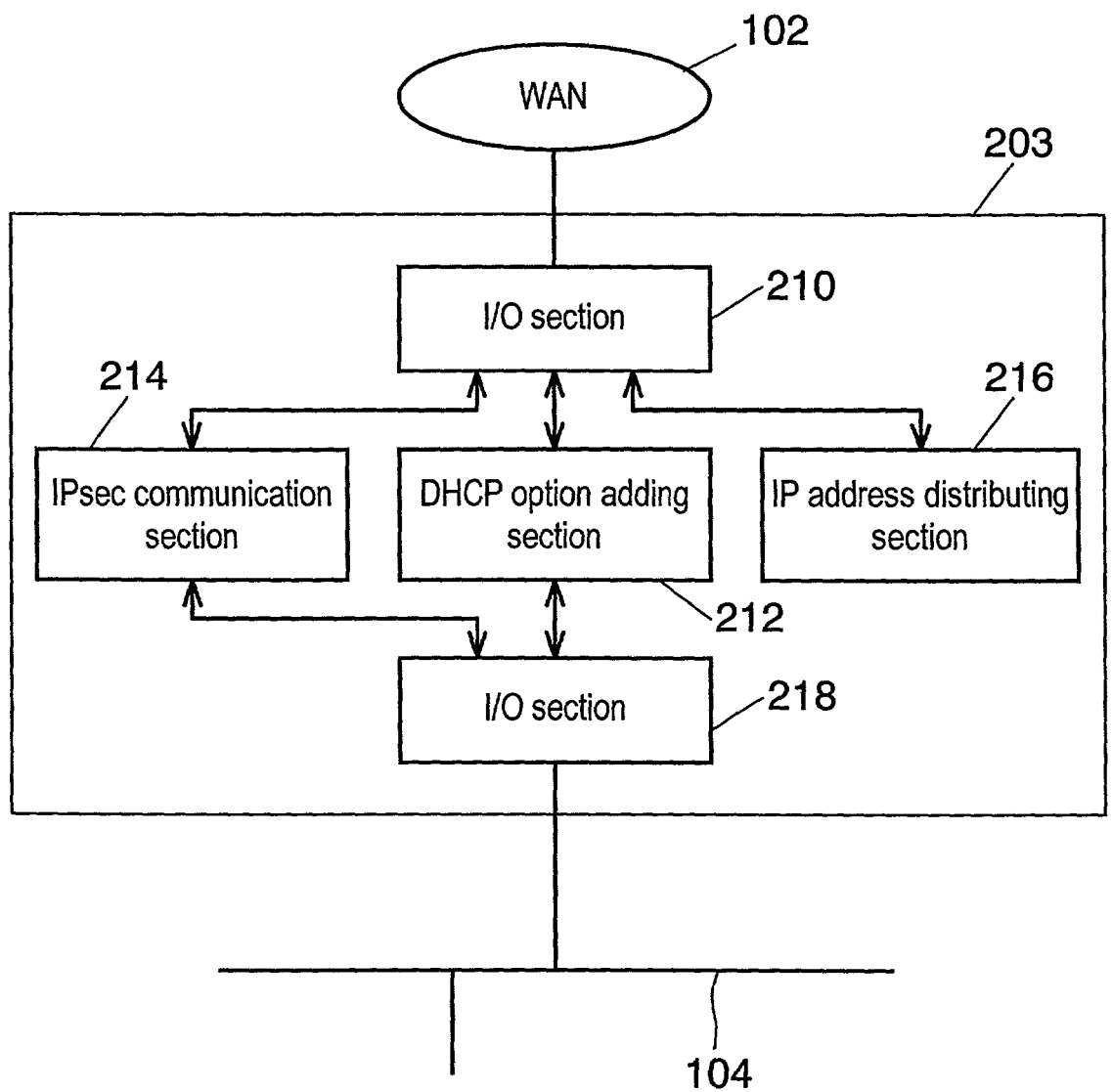
FIG. 4 is a block diagram of the security gateway apparatus of the present invention.

Now will be explained the security gateway apparatus employing the method described above of the embodiment, referring to FIG. 4.

Gateway apparatus 203 includes DHCP option adding section 212, IPsec communication section 214, IP address distribution section 216, I/O section 210 for WAN, and I/O section 218 for LAN.

As described in the method in the first preferred embodiment,

1) DHCP option adding section 212 adds the DHCP option to the IKE data;
2) IP address distributing section 216 distributes an IP address, via I/O section 210, to a terminal having a dialup connection with the WAN;
3) IPsec communication section 214 performs the IPsec communication, via I/O sections 210 and 218, between the WAN and inside the LAN.

Thus, according to the VPN communication method and the security gateway apparatus using the method, when establishing the IPsec communication with an outside PC having a dialup connection, the gateway apparatus can control the final destination IP address of the PC, therefore eliminating need for setting of the terminal on the LAN. This fact promises safeguarded communication.

Besides, with the method and the apparatus, the outside PC establishing VPN is virtually regarded as another terminal on the LAN. This allows the outside PC to access to any terminal on the LAN with safety.

Furthermore, the present invention makes possible that the outside PC accesses to a LAN environment that is configured with private IP addresses, with no degradation of security.

What is claimed is:

1. A Virtual Private Network (VPN) communication method employed for a security gateway apparatus connecting between a local area network (LAN) and a wide area network (WAN) including a public network, the communication method comprising the steps of:
    a) assigning a first IP address to a terminal outside said LAN;
    b) adding a Dynamic Host Configuration Protocol (DHCP) communication option to an Internet Key Exchange (IKE) data, when establishing an IKE communication with said terminal outside the LAN having a connection with the WAN;
    c) assigning a second IP address from an inside terminal within the LAN to the terminal outside the LAN during the IKE communication, said second address regardless of said first address; and
    d) establishing a Security Architecture for the Internet Protocol (IPsec) communication that follows the IKE communication, which includes said first IP address and said second IP address,
    wherein the gateway apparatus designates the first IP address for the outside terminal from a tunneled IP packet.

2. The VPN communication method employed for the security gateway apparatus as defined in claim 1, wherein an IP address and a subnet mask address, which have same segments as those of the LAN, are distributed to the outside terminal, thereby the outside terminal can be virtually regarded as a terminal on the LAN.

3. The VPN communication method for the security gateway apparatus as defined in claim 1, wherein the outside terminal is provided, during the IKE communication, with a private IP address that is used on the LAN, in a case that the LAN is configured with private IP addresses, whereby the outside terminal is allowed to access to a terminal on the LAN.

4. The VPN communication method for the security gateway apparatus according to claim 1, wherein an encryption key and an authentication key are exchanged with a public key cryptosystem during the IKE communication.

5. The VPN communication method for the security gateway apparatus according to claim 1, wherein the DHCP communication option contains an IP address and a subnet mask.

6. A security gateway apparatus connecting between a local area network (LAN) and a wide area network (WAN) including a public network, the apparatus comprising:
    a) a Dynamic Host Configuration Protocol (DHCP) option adding section adding a DHCP communication option to an IKE data when establishing an IKE communication with an outside terminal having a first IP address distributed from outside the LAN having a connection with the WAN;
    b) an IP address distribution section assigning a second IP address from an inside terminal within the LAN to the outside terminal during the IKE communication, said second address regardless of said first address; and
    c) an IPsec communication section performing an IPsec communication that follows the IKE communication, which includes said first IP address and said second IP address, wherein, the gateway apparatus designates the first IP address for the outside terminal from a tunneled IP packet.

7. The security gateway apparatus as defined in claim 6, wherein an IP address and a subnet mask address, which have same segments as those of the LAN, are distributed to the outside terminal, thereby the outside terminal can be virtually regarded as a terminal on the LAN.

8. The security gateway apparatus as defined in claim 6, wherein the outside terminal is provided, during the IKE communication, with a private IP address which is the same as one used on the LAN in a case that the LAN is configured with private IP addresses, whereby the outside terminal is allowed to access to a terminal on the LAN.

9. The security gateway apparatus according to claim 6, wherein an encryption key and an authentication key are exchanged with a public key cryptosystem during the IKE communication.

10. The security gateway apparatus according to claim 6, wherein the DHCP communication option contains an IP address and a subnet mask.

11. The VPN communication method for the security gateway apparatus according to claim 2, wherein an encryption key and an authentication key are exchanged with a public key cryptosystem during the IKE communication.

12. The VPN communication method for the security gateway apparatus according to claim 3, wherein an encryption key and an authentication key are exchanged with a public key cryptosystem during the IKE communication.

13. The VPN communication method for the security gateway apparatus according to claim 2, wherein the DHCP communication option contains an IP address and a subnet mask.

14. The VPN communication method for the security gateway apparatus according to claim 2, wherein the DHCP communication option contains an IP address and a subnet mask.

15. The security gateway apparatus according to claim 7, wherein an encryption key and an authentication key are exchanged with a public key cryptosystem during the IKE communication.

16. The security gateway apparatus according to claim 8, wherein an encryption key and an authentication key are exchanged with a public key cryptosystem during the IKE communication.

17. The security gateway apparatus according to claim 7, wherein the DHCP communication option contains an IP address and a subnet mask.

18. The security gateway apparatus according to claim 8, wherein the DHCP communication option contains an IP address and a subnet mask.

19. The VPN communication method employed for the security gateway apparatus as defined in claim 1, wherein said terminal outside the LAN has a dialup connection with the WAN.

20. The VPN communication method employed for the security gateway apparatus as defined in claim 1, wherein said second IP address is automatically distributed from the terminal within the LAN to the terminal outside the LAN during the IKE communication.

21. The security gateway apparatus as defined in claim 6, wherein said terminal outside the LAN has a dialup connection with the WAN.

22. The security gateway apparatus as defined in claim 6, wherein said second IP address is automatically distributed from the terminal within the LAN to the terminal outside the LAN during the IKE communication.

23. A VPN communication method according to claim 1, wherein said first IP address is assigned to said terminal from outside said LAN.

24. A security gateway apparatus according to claim 6, wherein said first IP address is assigned to said terminal from outside said LAN.

* * * * *